(12) United States Patent
Hosoya

(10) Patent No.: US 8,642,162 B2
(45) Date of Patent: Feb. 4, 2014

(54) NON-AQUEOUS PIGMENT INK

(75) Inventor: Tetsuo Hosoya, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 669 days.

(21) Appl. No.: 12/820,378

(22) Filed: Jun. 22, 2010

(65) Prior Publication Data

US 2011/0052884 A1 Mar. 3, 2011

(30) Foreign Application Priority Data

Aug. 26, 2009 (JP) ................................ P2009-195364

(51) Int. Cl.
*B32B 3/10* (2006.01)
*C08L 75/04* (2006.01)
*C08G 18/00* (2006.01)

(52) U.S. Cl.
USPC ........................ 428/195.1; 524/590; 528/74.5

(58) Field of Classification Search
None
See application file for complete search history.

(56) References Cited

U.S. PATENT DOCUMENTS

| 3,827,993 A * | 8/1974 | Cunningham et al. | ........ 530/233 |
| 4,094,838 A * | 6/1978 | Schneider et al. | ............ 106/252 |
| 2006/0001719 A1 * | 1/2006 | Fukushige | .................... 347/100 |

FOREIGN PATENT DOCUMENTS

JP 2007-197500 A 8/2007

* cited by examiner

*Primary Examiner* — Randy Gulakowski
*Assistant Examiner* — Jeffrey Washville
(74) *Attorney, Agent, or Firm* — Nath, Goldberg & Meyer; Jerald L. Meyer

(57) ABSTRACT

A non-aqueous pigment ink which suppresses show-through and improves the print density in printed items, and also exhibits excellent storage stability. The non-aqueous pigment ink comprises a pigment, a non-aqueous solvent, and non-aqueous resin dispersion particles having a pigment dispersion capability, wherein the non-aqueous resin dispersion particles comprise a urethane-modified alkyd resin formed from an oil-modified alkyd resin and/or fatty acid-modified alkyd resin having an oil length of not less than 50% by mass into which urethane groups have been introduced, and the urethane-modified alkyd resin is prepared by bonding an amino alcohol to double bonds within the oil-modified alkyd resin and/or fatty acid-modified alkyd resin, and then reacting the amino alcohol with a polyvalent isocyanate compound to introduce the urethane groups.

20 Claims, No Drawings

NON-AQUEOUS PIGMENT INK

CROSS REFERENCE TO RELATED APPLICATIONS

This Application is based upon and claims the benefit of priority from prior Japanese Patent Applications No. 2009-195364 filed on Aug. 26, 2009, the entire contents of which are incorporated by reference herein.

BACKGROUND OF THE INVENTION

1. Field of the Invention

The present invention relates to a non-aqueous pigment ink, and relates particularly to a non-aqueous pigment ink that is suitable for use in an inkjet recording system.

2. Description of the Related Art

The coloring materials for inks used in inkjet recording systems can be broadly classified into materials that use pigments and materials that use dyes, and there is a growing tendency for the use of inks that use pigments as the coloring materials, as such inks exhibit the excellent levels of light resistance, weather resistance and water resistance that are required for high image quality printing.

In terms of the solvent, inks can be broadly classified into aqueous inks and non-aqueous inks. Non-aqueous inks that do not use water as the ink solvent, including solvent-based inks that use a volatile solvent as the main constituent and oil-based inks that use a non-volatile solvent as the main constituent, exhibit superior drying properties to aqueous inks, and also display excellent printability.

In non-aqueous inks, a pigment dispersant that dissolves in the solvent is generally used, but because this pigment dispersant improves the affinity between the solvent and the pigment, when the solvent penetrates into the recording paper, the pigment tends to be also drawn into the interior of the recording paper. As a result, the print density tends to fall, and show-through becomes more prevalent.

Accordingly, Patent Document 1 has proposed a non-aqueous pigment ink that uses non-aqueous resin dispersion particles (NAD particles) having a pigment dispersion capability as a dispersant. By using a pigment dispersant that does not dissolve in the solvent, this non-aqueous ink is able to provide improved print density for printed items on plain paper. However, further improvements are still required in terms of the pigment dispersion stability.

Furthermore, using a NAD as the pigment dispersant tends to cause an increase in the ink viscosity, and high-viscosity inks tend to suffer from problems of inferior storage stability and discharge stability when used in inkjet recording systems. Moreover, the amount of pigment that can be added to the ink tends to be limited, making it difficult to obtain a printed image of high density.

Patent Document 1: Japanese Patent Laid-Open No. 2007-197500

SUMMARY OF THE INVENTION

The present invention has an object of providing a non-aqueous pigment ink which suppresses show-through and improves the print density in printed items, and also exhibits excellent storage stability.

A first aspect of the present invention provides a non-aqueous pigment ink comprising a pigment, a non-aqueous solvent, and non-aqueous resin dispersion particles having a pigment dispersion capability, wherein the non-aqueous resin dispersion particles comprise a urethane-modified alkyd resin formed from an oil-modified alkyd resin and/or fatty acid-modified alkyd resin having an oil length of not less than 50% by mass into which urethane groups have been introduced, and the urethane-modified alkyd resin is prepared by bonding an amino alcohol to double bonds within the oil-modified alkyd resin and/or fatty acid-modified alkyd resin, and then reacting the amino alcohol with a polyvalent isocyanate compound to introduce the urethane groups.

Another aspect of the present invention provides a pigment dispersant for a non-aqueous pigment ink, wherein the pigment dispersant comprises a urethane-modified alkyd resin, which is formed from an oil-modified alkyd resin and/or fatty acid-modified alkyd resin having an oil length of not less than 50% by mass into which urethane groups have been introduced and is insoluble in solvents having a 50% distillation point of 150° C. or higher, and the urethane-modified alkyd resin is prepared by bonding an amino alcohol to double bonds within the oil-modified alkyd resin and/or fatty acid-modified alkyd resin, and then reacting the amino alcohol with a polyvalent isocyanate compound to introduce the urethane groups.

DETAILED DESCRIPTION OF THE PREFERRED EMBODIMENTS

The non-aqueous ink according to the present invention (hereafter also referred to as simply "the ink") comprises, as essential components, a pigment, a non-aqueous solvent (hereafter also referred to as simply "the solvent"), and non-aqueous resin dispersion particles (hereafter also referred to as "NAD particles") having a pigment dispersion capability as a pigment dispersant.

The NAD particles comprise a urethane-modified alkyd resin formed from an oil-modified alkyd resin and/or fatty acid-modified alkyd resin having an oil length of not less than 50% by mass into which urethane groups have been introduced, wherein this urethane-modified alkyd resin is prepared by bonding an amino alcohol to double bonds within the oil-modified alkyd resin and/or fatty acid-modified alkyd resin, and then reacting the amino alcohol with a polyvalent isocyanate compound to introduce the urethane groups. The NAD particles are insoluble in the non-aqueous solvent used in the ink, and exist as particles within the ink.

The NAD particles form a core/shell structure composed of a core portion (a polar portion) that does not dissolve in the non-aqueous solvent of the ink, and a shell portion (a low-polarity portion) that is positioned at the solvent side of each particle and is solvated. It is thought that the core portion that is insoluble in the solvent has a role of improving the separation of the pigment and the solvent following printing, thereby preventing the pigment from penetrating into the interior of the paper together with the solvent, which enables the pigment to be retained at the paper surface, thus improving the print density. In contrast, it is thought that the shell portion (steric repulsion layer) has a role of enhancing the dispersion stability within the solvent, thereby forming the particle dispersion system.

Accordingly, these NAD particles undergo a powerful interaction (adsorption) with the pigment, and therefore image show-through on the printed item can be suppressed, the print density can be enhanced, and the storage stability of the ink can be improved. Moreover, because even a small amount of the NAD particles is capable of generating a satisfactory pigment dispersion effect, the viscosity of the ink can be suppressed to a low level, thereby enabling the discharge stability to be improved when the ink is used as an inkjet ink.

The oil-modified alkyd resin and/or fatty acid-modified alkyd resin is a resin comprising a polybasic acid and a polyhydric alcohol as structural units, wherein the resin has been modified with an oil and/or a fatty acid. A single oil-modified alkyd resin or fatty acid-modified alkyd resin may be used alone, or two or more resins may be used in combination.

By ensuring that the oil-modified alkyd resin and/or fatty acid-modified alkyd resin has an oil length of not less than 50% by mass, the solubility of the oil-modified alkyd resin and/or fatty acid-modified alkyd resin in the non-aqueous solvent can be improved, although because the introduced urethane groups are insoluble in the non-aqueous solvent, the separation of the solvent and the pigment is improved, enabling the print density to be enhanced. Here, the "oil length" describes the mass fraction (mass %) of the oil or fatty acid incorporated within the molecule (this definition also applies below). In the present invention, the oil length of the oil-modified alkyd resin and/or fatty acid-modified alkyd resin is determined on the basis of the solid fraction of the oil-modified alkyd resin and/or fatty acid-modified alkyd resin.

Moreover, the oil length of the oil-modified alkyd resin and/or fatty acid-modified alkyd resin is preferably not less than 65% by mass, and is more preferably 70% by mass or greater.

Furthermore, the iodine value of the oil-modified alkyd resin and/or fatty acid-modified alkyd resin is preferably not less than 80 g $I_2$/100 g, more preferably not less than 100 g $I_2$/100 g, and still more preferably 150 g $I_2$/100 g or greater. Here, the "iodine value" is an indicator of the number of double bonds contained within the molecule (this definition also applies below). In the present invention, the iodine value of the oil-modified alkyd resin and/or fatty acid-modified alkyd resin is determined on the basis of the solid fraction of the oil-modified alkyd resin and/or fatty acid-modified alkyd resin. Further, the iodine value of the oil-modified alkyd resin and/or fatty acid-modified alkyd resin can be calculated by multiplying the iodine value of the oil and/or fatty acid used in the oil-modified alkyd resin and/or fatty acid-modified alkyd resin by the oil length of the oil-modified alkyd resin and/or fatty acid-modified alkyd resin.

Adjusting the oil length of the oil-modified alkyd resin and/or fatty acid-modified alkyd resin and the iodine value of the oil-modified alkyd resin and/or fatty acid-modified alkyd resin so as to satisfy the respective ranges listed above ensures an appropriate amount of introduced urethane groups, enhances the separation of the solvent and the pigment, and prevents any deterioration in the density of the printed image. Further, ensuring an appropriate amount of introduced urethane groups enables the ink viscosity to be reduced, so that even when the NAD particles are included as a dispersant, the storage stability and discharge stability of the ink can be favorably maintained. Furthermore, because the viscosity of the ink can be reduced, the amount of the pigment within the ink can be increased, meaning the density of the printed image can be further improved.

Moreover, when the oil length of the oil-modified alkyd resin and/or fatty acid-modified alkyd resin and the iodine value of the oil-modified alkyd resin and/or fatty acid-modified alkyd resin are increased, the amount of introduced urethane groups increases, and using an ink comprising such an oil-modified alkyd resin and/or fatty acid-modified alkyd resin enables an improvement in the ink repellency of the nozzle plate surface of the inkjet head. In order to ensure that this effect manifests satisfactorily, the oil length of the oil-modified alkyd resin and/or fatty acid-modified alkyd resin is preferably adjusted to a value of at least 65% by mass, and the iodine value of the oil-modified alkyd resin and/or fatty acid-modified alkyd resin is preferably adjusted to a value of at least 150 g $I_2$/100 g.

The nozzle plate surface is typically subjected to an ink repellent treatment using a fluorine-based process or the like, and cleaning of the nozzle plate surface is typically conducted by discharging a small amount of ink, suctioning the ink off with a suction device, and then wiping the plate surface with a wiping blade. Abrasion of the nozzle plate surface by the wiping blade tends to cause a deterioration in the ink repellency of the nozzle plate surface. When the ink repellency of the nozzle plate surface deteriorates, the wettability of the surface by the ink increases, and therefore ink may adhere to the nozzle plate surface, causing discharge faults. Accordingly, providing a non-aqueous ink that improves the ink repellency of the nozzle plate surface is important.

Each oil and/or fatty acid used in the oil-modified alkyd resin and/or fatty acid-modified alkyd resin preferably has an iodine value that is not less than 100 g $I_2$/100 g, more preferably not less than 140 g $I_2$/100 g, and still more preferably 180 g $I_2$/100 g or greater.

Examples of oils that can be used in the oil-modified alkyd resin and/or fatty acid-modified alkyd resin include linseed oil (iodine value: 197 g $I_2$/100 g), soybean oil (iodine value: 131 g $I_2$/100 g), tall oil (iodine value: 135 g $I_2$/100 g), tung oil (iodine value: 163 g $I_2$/100 g) and cottonseed oil (iodine value: 109 g $I_2$/100 g).

Further, examples of fatty acids that can be used in the oil-modified alkyd resin and/or fatty acid-modified alkyd resin include linseed oil fatty acid (iodine value: 180 g $I_2$/100 g), soybean oil fatty acid (iodine value: 118 g $I_2$/100 g) and tall oil fatty acid (iodine value: 103 g $I_2$/100 g).

These oils and fatty acid may be used individually, or in combinations of two or more different compounds.

There are no particular restrictions on the polybasic acid that functions as a structural unit, and specific examples of polybasic acids that may be used include saturated polybasic acids such as phthalic anhydride, isophthalic acid, terephthalic acid, succinic acid, adipic acid, sebacic acid, tetrahydrophthalic anhydride and hexahydrophthalic anhydride, unsaturated polybasic acids such as maleic acid, maleic anhydride, fumaric acid, itaconic acid and citraconic anhydride, and combinations of the above acids.

Examples of the polyhydric alcohol that functions as a structural unit include ethylene glycol, diethylene glycol, triethylene glycol, polyethylene glycol, propylene glycol, dipropylene glycol, polypropylene glycol, neopentyl glycol, 1,3-butanediol, 1,6-hexanediol, trimethylene glycol, tetramethylene glycol, glycerol, trimethylolpropane, trimethylolethane, pentaerythritol, dipentaerythritol, and combinations of these polyhydric alcohols.

Specific examples of the oil-modified alkyd resin and/or fatty acid-modified alkyd resin include alkyd resins such as linseed oil-modified alkyd resins, soybean oil-modified alkyd resins, tall oil-modified alkyd resins, tung oil-modified alkyd resins, and cottonseed oil-modified alkyd resins. These resins may be used individually, or two or more different resins may be used in combination.

Examples of commercially available products that can be used favorably as the oil-modified alkyd resin and/or fatty acid-modified alkyd resin include linseed oil-modified alkyd resins such as Arakyd 310 (manufactured by Arakawa Chemical Industries, Ltd.) and Arakyd 5001 (manufactured by Arakawa Chemical Industries, Ltd.), soybean oil-modified alkyd resins such as Arakyd 3145-80 (manufactured by Arakawa Chemical Industries, Ltd.), and tall oil-modified alkyd resins such as Arakyd 1465-60 (manufactured by Arakawa Chemical Industries, Ltd.). These resins may be used individually, or two or more different resins may be used in combination.

The urethane groups that are introduced to form the urethane-modified alkyd resin contain a urethane group (urethane linkage) which has a high polarity and adsorbs to the pigment, namely a carbamate ester portion ($H_2NCOOR$ or $RNHCOOR$), and these urethane groups adsorb the pigment to form the core portion (the solvent-insoluble portion) of the NAD particles.

The urethane groups form side chains (branches) off the main chain (trunk) of the urethane-modified alkyd resin together with the above long-chain alkyl groups. These urethane group-containing branches may be polyurethanes formed from repeating urethane linkages, thereby forming branch polymers.

There are no particular restrictions on the molecular weight (mass average molecular weight) of the urethane-modified alkyd resin, although if the ink is to be used as an inkjet ink, then from the viewpoint of achieving favorable ink dischargeability, the molecular weight is preferably within a range from 3,000 to approximately 50,000, and is more preferably from 5,000 to approximately 20,000.

The glass transition temperature (Tg) of the urethane-modified alkyd resin is preferably not higher than room temperature, and is more preferably 0° C. or lower. This ensures that when the ink is fixed on the recording medium, film formation is promoted at room temperature.

There are no particular restrictions on the particle size of the NAD particles, but when used within an inkjet ink, the particle size of the NAD particles must be sufficiently small compared with the nozzle diameter, and is typically not more than 0.3 μm, and preferably not more than 0.1 μm.

The urethane-modified alkyd resin is preferably produced by bonding an amino alcohol to double bonds within the aforementioned oil-modified alkyd resin and/or fatty acid-modified alkyd resin (trunk polymer), and then reacting the amino alcohol with a polyvalent isocyanate compound to introduce the urethane groups.

In this reaction, the amino group of the amino alcohol reacts with, and bonds to, an unsaturated double bond within the oil-modified alkyd resin and/or fatty acid-modified alkyd resin. The isocyanate ester group ($R^1N\!\!=\!\!C\!\!=\!\!O$) of the polyvalent isocyanate compound then undergoes an addition reaction with the hydroxyl group of the amino alcohol in the manner illustrated below, thus yielding a urethane group (urethane linkage) (a carbamate ester: $R^1NHCOOR$):

$$R^1N\!\!=\!\!C\!\!=\!\!O + R\!\!-\!\!OH \rightarrow ROCONHR^1$$

wherein 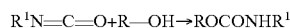 represents the amino alcohol portion bonded to a functional group of the trunk polymer.

As a result, urethane groups that function as pigment adsorption groups are introduced into the trunk polymer, which itself lacks any such pigment adsorption capability.

Examples of the amino alcohol include monomethylethanolamine, diethanolamine and diisopropanolamine. Of these, dialkanolamines (secondary alkanolamines) represented by general formula $(HOR)_2NH$ (wherein R is a divalent hydrocarbon group) are preferred, as they provide two hydroxyl groups, enabling the number of urethane groups formed to be increased. A combination of a plurality of these amino alcohols may also be used.

From the viewpoint of introducing an appropriate amount of urethane groups, this amino alcohol is preferably reacted in an amount within a range from 0.05 to 1 molar equivalent, and more preferably 0.1 to 1 molar equivalent, relative to the amount of double bonds within the oil-modified alkyd resin and/or fatty acid-modified alkyd resin. When the amount of the amino alcohol is less than 1 molar equivalent, unreacted double bonds will remain within the alkyd resin. However because the urethane-modified alkyd resin exists as dispersed particles within the ink, any occurrence of oxidative polymerization via these residual double bonds is inhibited, meaning thickening or gelling of the ink is prevented.

Examples of the polyvalent isocyanate compound include aliphatic, alicyclic and aromatic compounds, such as 1,6-diisocyanatohexane, 1,3-bis(isocyanatomethyl)benzene, 1,3-bis(isocyanatomethyl)cyclohexane and 1,5-naphthalene diisocyanate. A plurality of these compounds may also be used in combination.

In order to ensure that no unreacted raw materials or the like remain following introduction of the urethane groups via reaction of the polyvalent isocyanate compound with the hydroxyl groups, the polyvalent isocyanate compound is preferably reacted in an amount that is substantially equimolar (0.98 to 1.02 molar equivalents) with the amount of hydroxyl groups contained with the supplied raw material.

In this manner, urethane side chains (grafts) that are insoluble in the solvent are formed at the amino alcohol sites bonded to the double bonds within the oil-modified alkyd resin and/or fatty acid-modified alkyd resin (trunk polymer) that is soluble in the solvent, and these urethane side chains form dispersed particle nuclei. The final result of this process is the formation of polymer particles (NAD particles) enveloped within a shell structure (trunk polymer) that can undergo solvation within the solvent.

In the above reaction, a polyhydric alcohol is preferably also added, so that the polyhydric alcohol and the polyvalent isocyanate compound are also reacted. By adding a polyvalent alcohol, the urethane group formation can be repeated, enabling polyurethane side chains (branch polymers) that function as higher polarity side chains to be obtained.

Examples of the polyhydric alcohol include ethylene glycol, propylene glycol; dipropylene glycol, 1,3-propanediol, polyethylene glycol and polypropylene glycol. A plurality of these polyhydric alcohols may also be used.

The polyhydric alcohol is important for controlling the size of the NAD particles, and as the amount of the polyhydric alcohol is increased, the NAD particles increase in size. However, if the particle size increases excessively, then the discharge stability and pigment dispersibility of the ink tend to deteriorate, and therefore the amount of the polyhydric alcohol relative to the amino alcohol is preferably within a range from 0 to 20 molar equivalents, and more preferably from 1 to 10 molar equivalents.

The mass ratio between the alkyd resin portion (trunk polymer) and the introduced urethane group portions (branches or branch polymers) within the urethane-modified alkyd resin is preferably within a range from 60:40 to 99:1, more preferably from 85:15 to 99:1, and still more preferably from 90:10 to 99:1. From the viewpoint of the viscosity of the resulting ink, the mass ratio of the urethane group portions is preferably not more than 40. The mass of the alkyd resin portion within the urethane-modified alkyd resin represents the combined mass of the oil-modified alkyd resin and/or fatty acid-modified alkyd resin used as the raw material, whereas the mass of the introduced urethane group portions represents the mass of the amino alcohol and polyvalent isocyanate compound used in the reaction, or in those cases where a polyhydric alcohol is also used, represents the combined mass of the amino alcohol, the polyvalent isocyanate compound and the polyhydric alcohol.

The obtained NAD particles themselves exhibit an excellent pigment dispersion capability, and therefore the amount of the NAD particles may be less than that of conventional pigment dispersants, and no other separate pigment dispersant need be added. As a result, the types of problems typically associated with the addition of a polymer-based pigment dispersant, namely an increase in the viscosity of the ink and a deterioration in the storage stability, can be suppressed, and the discharge stability within an inkjet recording system can be improved. Moreover, favorable storage stability can be achieved not only under normal operating conditions, but also under high-temperature operating conditions.

Examples of pigments that may be used for a black ink include carbon blacks such as furnace black, lamp black, acetylene black and channel black, metals or metal oxides such as copper, iron and titanium oxide, and organic pigments such as orthonitroaniline black. These pigments may be used either individually, or in combinations of two or more different pigments.

Examples of pigments that may be used for color inks include toluidine red, permanent carmine FB, disazo orange PMP, lake red C, brilliant carmine 6B, quinacridone red, dioxane violet, orthonitroaniline orange, dinitroaniline orange, vulcan orange, chlorinated para red, brilliant fast scarlet, naphthol red 23, pyrazolone red, barium red 2B, calcium red 2B, strontium red 2B, manganese red 2B, barium lithol red, pigment scarlet 3B lake, lake bordeaux 10B, anthocyn 3B lake, anthocyn 5B lake, rhodamine 6G lake, eosine lake, iron oxide red, naphthol red FGR, rhodamine B lake, methyl violet lake, dioxazine violet, naphthol carmine FB, naphthol red M, fast yellow AAA, fast yellow 10G, disazo yellow AAMX, disazo yellow AAOT, disazo yellow AAOA, disazo yellow HR, isoindoline yellow, fast yellow G, disazo yellow AAA, phthalocyanine blue, Victoria pure blue, basic blue 5B lake, basic blue 6G lake, fast sky blue, alkali blue R toner, peacock blue lake, Prussian blue, ultramarine, reflex blue 2G, reflex blue R, alkali blue G toner, brilliant green lake, diamond green thioflavine lake, phthalocyanine green G, green gold, phthalocyanine green Y, iron oxide powder, rust powder, zinc white, titanium oxide, calcium carbonate, clay, barium sulfate, alumina white, aluminum powder, bronze powder, daylight fluorescent pigments, and pearl pigments. These pigments may be used either individually, or in arbitrary mixtures.

From the viewpoints of discharge stability and storage stability, the average particle size of the pigment is preferably not more than 300 nm, is more preferably not more than 150 nm, and is most preferably 100 nm or less. In this description, the average particle size of the pigment refers to the value measured using a dynamic light-scattering particle size distribution measurement apparatus LB-500 manufactured by Horiba, Ltd.

The term "non-aqueous solvent" refers to non-polar organic solvents and polar organic solvents for which the 50% distillation point is at least 150° C. The "50% distillation point" is measured in accordance with JIS K0066 "Test Methods for Distillation of Chemical Products" and refers to the temperature at which 50% by mass of the solvent is evaporated. From the viewpoint of safety, the use of a solvent for which this 50% distillation point is at least 160° C., and particularly 230° C. or higher, is preferred.

For example, examples of preferred non-polar organic solvents include aliphatic hydrocarbon solvents, alicyclic hydrocarbon solvents and aromatic hydrocarbon solvents. Specific examples of the aliphatic hydrocarbon solvents and alicyclic hydrocarbon solvents include Teclean N-16, Teclean N-20, Teclean N-22, Nisseki Naphtesol L, Nisseki Naphtesol M, Nisseki Naphtesol H, No. 0 Solvent L, No. 0 Solvent M, No. 0 Solvent H, Nisseki Isosol 300, Nisseki Isosol 400, AF-4, AF-5, AF-6 and AF-7, all manufactured by Nippon Oil Corporation; and Isopar G, Isopar H, Isopar L, Isopar M, Exxsol D40, Exxsol D80, Exxsol D100, Exxsol D130 and Exxsol D140, all manufactured by Exxon Mobil Corporation. Specific examples of the aromatic hydrocarbon solvents include Nisseki Cleansol G (alkylbenzene) manufactured by Nippon Oil Corporation and Solvesso 200 manufactured by Exxon Mobil Corporation.

Examples of solvents that can be used as the polar organic solvent include ester-based solvents, alcohol-based solvents, higher fatty acid-based solvents, ether-based solvents, and mixtures thereof. Specific examples include:

ester-based solvents containing 14 or more carbon atoms within each molecule, such as methyl laurate, isopropyl laurate, isopropyl myristate, isopropyl palmitate, isostearyl palmitate, isooctyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate;

alcohol-based solvents containing 12 or more carbon atoms within each molecule, such as isomyristyl alcohol, isopalmityl alcohol, isostearyl alcohol and oleyl alcohol;

higher fatty acid-based solvents such as isononanoic acid, isomyristic acid, hexadecanoic acid, isopalmitic acid, oleic acid and isostearic acid; and ether-based solvents such as diethylene glycol monobutyl ether, ethylene glycol monobutyl ether, propylene glycol monobutyl ether and propylene glycol dibutyl ether.

These non-aqueous solvents may be used either individually, or in mixtures of two or more different solvents.

The ink may also include other arbitrary components in amounts that do not impair the effects of the present invention.

For example, resins that may be added besides the above NAD particles include acrylic resins, styrene-acrylic resins, styrene-maleic acid resins, rosin-based resins, rosin ester-based resins, ethylene-vinyl acetate resins, petroleum resins, coumarone-indene resins, terpene phenol resins, phenolic resins, urethane resins, melamine resins, urea resins, epoxy resins, cellulose-based resins, vinyl chloride acetate resins, xylene resins, alkyd resins, aliphatic hydrocarbon resins, butyral resins, maleic acid resins, fumaric acid resins, hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, high-molecular weight copolymers, modified polyurethanes, modified polyacrylates, polyether ester anionic surfactants, naphthalenesulfonic acid-formalin condensate salts, aromatic sulfonic acid-formalin condensate salts, polyoxyethylene alkyl phosphate esters, polyoxyethylene nonylphenyl ethers, polyester polyamines, and stearyl amine acetate.

Appropriate amounts of nozzle blockage prevention agents, antioxidants, conductivity modifiers, viscosity modifiers, surface tension modifiers and oxygen absorbers and the like may also be added. There are no particular restrictions on the specific variety of these additives, and the types of materials typically used within this field may be used.

The amount of the pigment within the ink is typically within a range from 0.01 to 20% by mass, and from the viewpoints of print density and ink viscosity, is preferably within a range from 1 to 15% by mass, and more preferably from 5 to 10% by mass.

In terms of ensuring favorable pigment dispersibility, the amount of the NAD particles within the ink is preferably not less than 0.1% by mass, and is more preferably 2.0% by mass or greater. However, if the amount of the NAD particles is too high, then not only does the ink viscosity become overly high, but the storage stability under high-temperature conditions also tends to worsen, and therefore the amount of the NAD particles is preferably not more than 20.0% by mass, and is more preferably 10.0% by mass or less. The amount of the NAD particles within the ink is most preferably within a range from 3.0 to 8.0% by mass.

The mass of the resin containing the NAD particles (or the total mass of resins in those cases where the ink also includes other resins besides the NAD particles) relative to a value of 1 for the mass of the pigment is preferably not less than 0.3 and not more than 1.0. From the viewpoint of ensuring a favorable pigment dispersibility effect, this mass of the resin is preferably not less than 0.3, more preferably not less than 0.4, and most preferably 0.5 or greater. On the other hand, from the viewpoints of improving the ink viscosity and avoiding discharge faults caused by changes in the ink over time, the mass of the resin is preferably not more than 1.0.

When used within an inkjet recording system, the ideal range for the viscosity of the ink varies depending on factors such as the diameter of the discharge head nozzles and the discharge environment, but at 25° C., is typically within a range from 5 to 30 mPa·s, and preferably from 5 to 15 mPa·s, and is most preferably approximately 10 mPa·s for use within an inkjet recording apparatus. Here, the viscosity is measured at 25° C. by raising the shear stress from 0 Pa at a rate of 0.1 Pa/s, and refers to the measured value at 10 Pa.

The pigment dispersant for a non-aqueous pigment ink according to the present invention comprises a urethane-modified alkyd resin, which is formed from an oil-modified alkyd resin and/or fatty acid-modified alkyd resin having an oil length of not less than 50% by mass into which urethane groups have been introduced, and is insoluble in solvents having a 50% distillation point of 150° C. or higher.

The urethane-modified alkyd resin is preferably prepared by bonding an amino alcohol to double bonds within the oil-modified alkyd resin and/or fatty acid-modified alkyd resin, and then reacting the amino alcohol with a polyvalent isocyanate compound to introduce the urethane groups. Moreover, the preparation preferably also includes a reaction between the polyvalent isocyanate compound and a polyhydric alcohol.

In this type of urethane-modified alkyd resin, urethane side chains (grafts) that are insoluble in the solvent are formed at the amino alcohol sites bonded to the double bonds within the oil-modified alkyd resin and/or fatty acid-modified alkyd resin (trunk polymer) that is soluble in the solvent, and these urethane side chains form dispersed particle nuclei. The final result of this process is the formation of polymer particles (NAD particles) enveloped within a shell structure (trunk polymer) that can undergo solvation within the solvent.

When added to a non-aqueous pigment ink, this pigment dispersant forms NAD particles that exhibit the type of pigment dispersion effect described above. As a result, a non-aqueous pigment ink can be provided which is able to increase the print density of printed items, and also offers excellent storage stability.

Although there are no particular restrictions on the printing method used with the ink according to the present invention, printing is preferably conducted using an inkjet recording apparatus. The inkjet printer may employ any of various printing systems, including a piezo system, electrostatic system or thermal system. In those cases where an inkjet recording apparatus is used, the ink according to the present invention is discharged from the inkjet head based on a digital signal, and the discharged ink droplets are adhered to the recording medium.

The ink according to the present invention can be used favorably even under low-temperature operating conditions, and exhibits excellent discharge stability when used within an inkjet recording system.

A printed item according to the present invention is an item printed using the ink of the present invention described above. By using the ink according to the present invention, a printed item is obtained in which the pigment within the ink is inhibited from penetrating into the interior of the printing paper, and is rather retained at the surface of the paper, resulting in a high print density.

EXAMPLES

A more detailed description of the present invention is provided below based on a series of examples, although the present invention is in no way limited by these examples. In the following description, the units "% by mass" are abbreviated as simply "%".

(1) Trunk Polymer

The oil-modified alkyd resins shown below in Table 1 were used as trunk polymers a to c.

The iodine value of each of these trunk polymers was calculated using the equation shown below.

(Iodine value of trunk polymer)=(iodine value of oil component of trunk polymer)×(oil length of trunk polymer)

TABLE 1

| | | | Trunk polymers | | | |
|---|---|---|---|---|---|---|
| | | Product name (manufacturer) | Oil for oil component of trunk polymer | Iodine value of oil component of trunk polymer (g I$_2$/100 g) | Oil length of trunk polymer (mass %)* | Iodine value of trunk polymer (g I$_2$/100 g)* |
| | Solid fraction | | | | | |
| Trunk polymer a | Solid fraction 100% | Arakyd 310 (Arakawa Chemical Industries, Ltd.) | Linseed oil | 197 | 78 | 154 |

TABLE 1-continued

| | | | Trunk polymers | | | |
|---|---|---|---|---|---|---|
| | Solid fraction | Product name (manufacturer) | Oil for oil component of trunk polymer | Iodine value of oil component of trunk polymer (g $I_2$/100 g) | Oil length of trunk polymer (mass %)* | Iodine value of trunk polymer (g $I_2$/100 g)* |
| Trunk polymer b | Solid fraction 100% | Arakyd 5001 (Arakawa Chemical Industries, Ltd.) | Linseed oil | 197 | 71 | 140 |
| Trunk polymer c | Solid fraction 80% (solvent: terpene) | Arakyd 3145-80 (Arakawa Chemical Industries, Ltd.) | Soybean oil | 131 | 64 | 84 |

*Calculated on the basis of the solid fraction of the trunk polymer

(2) Production of Non-Aqueous Dispersions Comprising NAD Particles

Non-aqueous dispersions were produced with the compositions shown in Table 2. A 300 mL four-neck flask was charged with 61.24 g of Arakyd 310, 0.44 g of propylene glycol (manufactured by Asahi Glass Co., Ltd.), 0.60 g of diethanolamine (manufactured by Nippon Shokubai Co., Ltd.) and 111.9 g of isooctyl palmitate (IOP, manufactured by Nikko Chemicals Co., Ltd.) as a solvent, and the temperature was raised to 110° C. under a stream of nitrogen gas and with constant stirring. The temperature was then held at 110° C. for two hours. Subsequently, 0.04 g of dibutyltin dilaurate was added as a catalyst, and a mixture containing 2.25 g of Takenate 600 (1,3-bis(isocyanatomethyl)cyclohexane, manufactured by Mitsui Chemicals, Inc.) and 20.25 g of IOP was added dropwise to the flask from a dropping funnel over a period of 30 minutes. Following completion of the dropwise addition, the dropping funnel was cleaned with a further 18.42 g of IOP. With the temperature held at 110° C., the reaction was allowed to proceed for 6 hours, and the reaction mixture was then cooled, yielding a non-aqueous dispersion D1 having a solid fraction (NAD particles) of 30%.

Using the same method as above, non-aqueous dispersions D2 to D4 were produced with the compositions shown in Table 2. The amounts shown for the trunk polymer in Table 2 are solid fraction amounts.

The mass average molecular weights (determined by a GPC method and referenced against standard polystyrenes) of the obtained urethane-modified alkyd resins (including the branch polymers) were D1: 6,300, D2: 6,900, D3: 7,500 and D4: 6,600.

TABLE 2

| | | Composition of non-aqueous dispersions | | | |
|---|---|---|---|---|---|
| | | D1 | D2 | D3 | D4 |
| Trunk polymer (g) | Trunk polymer a | 61.24 | — | — | 61.24 |
| | Trunk polymer b | — | 61.24 | — | — |
| | Trunk polymer c | — | — | 76.55 | — |
| Branch polymer (g) | Propylene glycol | 0.44 | 0.44 | 0.44 | 0.44 |
| | Diethanolamine | 0.60 | 0.60 | 0.60 | 1.20 |
| | Takenate 600 | 2.25 | 2.25 | 2.25 | 3.37 |
| Solvent (g) | IOP | 150.57 | 150.57 | 135.26 | 154.58 |
| Mass ratio: Trunk polymer/Branch polymer (note) | | 95/5 | 95/5 | 95/5 | 92/8 |

(note) Polyurethane side chains

The solid fraction and solvent composition for each of the non-aqueous dispersions D1 to D4 were as follows.

D1: solid fraction 30%, IOP 70.0%
D2: solid fraction 30%, IOP 70.0%
D3: solid fraction 30%, IOP 62.9%, terpene 7.1%
D4: solid fraction 30%, IOP 70.0%

(3) Preparation of Inks

Example 1

16.67 g of the prepared dispersion D1, 10 g of a pigment (carbon black MA11, manufactured by Mitsui Chemicals, Inc.), 10 g of AF-7 (AF Solvent No. 7, a naphthene-based solvent, manufactured by Nippon Oil Corporation, this definition also applies below) and 13.3 g of IOP were mixed, zirconia beads (diameter: 0.5 mm) were added, and the mixture was dispersed for 120 minutes using a rocking mill (manufactured by Seiwa Technical Lab Co., Ltd.). Following dispersion, the zirconia beads were removed, the dispersion was filtered sequentially through 3.0 μm and 0.8 μm membrane filters to remove any contaminants and coarse particles, and the mixture was diluted with 30 g of AF-7 and 20 g of IOP, yielding an ink in which the pigment was dispersed by the NAD particles (pigment content: 10%). The mass ratio of the resin (solid fraction) relative to a value of 1 for the pigment is shown in Table 1.

Examples 2 to 4, Comparative Examples 1 to 4

Using the blend amounts shown in Table 3, inks of each of the examples and comparative examples were prepared in the same manner as example 1.

In comparative examples 1 to 4, a solution of the trunk polymer a, a solution of the trunk polymer b, a solution of the trunk polymer c, and 528000 (Solsperse 28000, manufactured by The Lubrizol Corporation, solid fraction: 100%) respectively were used instead of the non-aqueous dispersion.

TABLE 3

Inks and evaluation results

| | Mass % | Example 1 | Example 2 | Example 3 | Example 4 | Comparative example 1 | Comparative example 2 | Comparative example 3 | Comparative example 4 |
|---|---|---|---|---|---|---|---|---|---|
| Pigment | MA11 | 10.00 | 10.00 | 10.00 | 10.00 | 10.00 | 10.00 | 10.00 | 10.00 |
| Non-aqueous dispersion | D1 | 16.67 | — | — | — | — | — | — | — |
| | D2 | — | 16.67 | — | — | — | — | — | — |
| | D3 | — | — | 16.67 | — | — | — | — | — |
| | D4 | — | — | — | 16.67 | — | — | — | — |
| Solution of trunk polymer a | | — | — | — | — | 5.00 | — | — | — |
| Solution of trunk polymer b | | — | — | — | — | — | 5.00 | — | — |
| Solution of trunk polymer c | | — | — | — | — | — | — | 5.00 | — |
| | S28000 | — | — | — | — | — | — | — | 5.00 |
| Diluting solvent used for dispersion | AF-7 | 10.00 | 10.00 | 10.00 | 10.00 | 10.00 | 10.00 | 10.00 | 10.00 |
| | IOP | 13.33 | 13.33 | 13.33 | 13.33 | 25.00 | 25.00 | 25.00 | 25.00 |
| Solvent used for viscosity modification | AF-7 | 30.00 | 30.00 | 30.00 | 30.00 | 30.00 | 30.00 | 30.00 | 30.00 |
| | IOP | 20.00 | 20.00 | 20.00 | 20.00 | 20.00 | 20.00 | 20.00 | 20.00 |
| Total | | 100.00 | 100.00 | 100.00 | 100.00 | 100.00 | 100.00 | 100.00 | 100.00 |
| Mass ratio of resin (solid fraction) relative to a value of 1 for pigment | | 0.5 | 0.5 | 0.5 | 0.5 | 0.5 | 0.5 | 0.5 | 0.5 |
| Physical properties | Average particle size (nm) | 101 | 104 | 81 | 89 | 94 | 92 | 90 | 80 |
| | Viscosity (mPa · s) | 9.1 | 9.7 | 11.8 | 9.1 | 11.8 | 12.1 | 10.7 | 9.6 |
| Evaluation | Print density (surface OD) | A | A | A | A | C | C | C | B |
| | Print density (rear surface OD) | A | A | B | A | C | C | C | C |
| | Storage stability (70° C., 1 month) | A | A | A | A | C | C | C | A |
| | Discharge stability | A | A | A | A | C | C | C | A |
| | Ink repellency | AA | A | A | AA | C | C | C | B |

<Ink Average Particle Size, Viscosity>

The inks prepared in the examples all exhibited an average particle size and a viscosity that were within the respective ideal ranges for use as an inkjet ink. The average particle size of the ink was measured using a dynamic light-scattering particle size distribution measurement apparatus LB-500 manufactured by Horiba, Ltd. The viscosity of the ink represents the viscosity at 10 Pa when the shear stress was raised from 0 Pa at a rate of 0.1 Pa/s at a temperature of 25° C., and was measured using a rheometer AR-G2, manufactured by TA Instruments, Japan Inc. (cone angle: 2°, diameter 40 mm).

<Ink storage stability (70° C.)>

Each of the inks obtained from the examples and comparative examples was placed inside a sealed container and left to stand for 4 weeks at 70° C., and following this standing period, the change in ink viscosity was measured and evaluated against the following criteria.

Viscosity change=[(Viscosity after 4 weeks×100)/(Initial viscosity)]−100(%) Inks for which the viscosity change was less than 5% were evaluated as A, inks for which the viscosity change was at least 5% but less than 10% were evaluated as B, and inks for which the viscosity change was 10% or greater were evaluated as C.

<Ink Repellency>

Each of the inks obtained from the examples and comparative examples was loaded into an inkjet printer Orphis HC5500 (manufactured by Riso Kagaku Corporation), a head cleaning operation was performed 4,000 times using the "normal cleaning" operation provided for head maintenance, and the ink repellency of the portion of the nozzle plate surface that contacts the wiping blade was evaluated using the criteria listed below. In the "normal cleaning" operation, the ink pathway was pressurized to expel any ink from the head nozzles, and a rubber wiping blade was wiped across the nozzle surface while a suction system was used to suck any residual ink off the nozzle plate surface.

AA: ink repellency was retained across the entire portion that contacts the wiping blade, and ink was completely repelled immediately following the head cleaning operation.

A: ink repellency was retained across the entire portion that contacts the wiping blade, and ink was repelled within 20 seconds of completing the head cleaning operation.

B: the ink repellency deteriorated within part of the portion that contacts the wiping blade.

C: the ink repellency deteriorated across the entire portion that contacts the wiping blade.

<Printing Using the Inks>

Each of the inks obtained from the examples and comparative examples was loaded into an inkjet printer "Orphis HC5500" (manufactured by Riso Kagaku Corporation), and the print density and discharge stability were evaluated by performing printing onto plain paper (Riso lightweight paper, manufactured by Riso Kagaku Corporation). The HC5500 is a system that uses a 300 dpi line-type inkjet head (in which the nozzles are aligned with an approximately 85 μm spacing therebetween), wherein the paper is transported in a sub-scanning direction perpendicular to the main scanning direction (the direction along which the nozzles are aligned) while printing is conducted.

<Ink Discharge Stability>

100 copies of a solid image with dimensions of 51 mm (600 nozzle widths) in the main scanning direction×260 mm in the sub-scanning direction were printed in a continuous manner. Unprinted portions caused by ink discharge faults were observed as white bands within the image. The discharge stability was evaluated against the criteria shown below, by counting the number of these white bands that occurred across the 100 printed items (equivalent to a total of 60,000 nozzles).

A: no discharge faults, B: less than 5 white bands, C: 5 or more white bands

<Printed Item Image Density>

The OD values for the printed surface and the rear surface of a solid image obtained in the same manner as that described above were measured using an optical densitometer (RD920, manufactured by Macbeth Corporation), and the image densities were then evaluated against the criteria below. A high surface OD value indicates high image density, and a low rear surface OD value indicates minimal show-through, both of which are desirable.

Print Density (Surface OD)

A: 1.17 or greater, B: 1.12 to 1.16, C, 1.08 to 1.11, D: 1.07 or less

Print Density (Rear Surface OD)

A: 0.28 or less, B: 0.29 to 0.33, C: 0.34 or greater

The results of the above evaluations are shown in Table 3.

Even without the addition of a separate pigment dispersant, each of the inks of the examples exhibited excellent storage stability under high-temperature conditions, yielded printed items of increased density in which show-through was suppressed, and was able to maintain favorable discharge stability.

Further, the inks of examples 1, 2 and 4 had higher values for both the oil length of the trunk polymer and the iodine value of the trunk polymer, and these inks exhibited an even more favorable print density (rear surface OD value), indicating even better suppression of show-through. It is thought that these findings are due to accelerated separation of the pigment from the solvent.

Furthermore, the inks of examples 1 and 4 had the highest values for both the oil length of the trunk polymer and the iodine value of the trunk polymer, and these inks exhibited particularly superior ink repellency. It is thought that this finding is due to an increase in the ratio of urethane groups introduced at the unsaturated double bonds within the trunk polymer.

In contrast, in comparative examples 1 to 3, dispersion was performed using a resin in which no branch polymers (urethane groups) were bonded to the trunk polymer, but the pigment dispersibility was poor, the discharge stability and storage stability were inferior, and the printed items exhibited neither an increase in the density nor suppression of show-through.

Comparative example 4 represents a conventional pigment ink using a commercially available pigment dispersant, and in this case, although favorable storage stability and discharge stability were obtained, the pigment tended to penetrate into the paper together with the solvent and the pigment dispersant, meaning show-through could not be prevented.

The present invention is able to provide a non-aqueous pigment ink which suppresses show-through and improves the print density in printed items, and also exhibits excellent storage stability.

It is to be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. A non-aqueous pigment ink comprising a pigment a non-aqueous solvent, and non-aqueous resin dispersion particles having a pigment dispersion capability, wherein
the non-aqueous resin dispersion particles comprise a urethane-modified alkyd resin formed from an oil-modified alkyd resin and/or fatty acid-modified alkyd resin having an oil length of not less than 50% by mass into which urethane groups have been introduced, and
the urethane-modified alkyd resin is prepared by bonding an amino alcohol to double bonds within the oil-modified alkyd resin and/or fatty acid-modified alkyd resin, and then reacting the amino alcohol with a polyvalent isocyanate compound to introduce the urethane groups.

2. The non-aqueous pigment ink according to claim 1, wherein
the oil-modified alkyd resin and/or fatty acid-modified alkyd resin has an iodine value of not less than 80 g I2/100 g.

3. The non-aqueous pigment ink according to claim 2, wherein
the oil-modified alkyd resin and/or fatty acid-modified alkyd resin has an iodine value of not less than 100 g I2/100 g.

4. The non-aqueous pigment ink according to claim 3, wherein
the oil-modified alkyd resin and/or fatty acid-modified alkyd resin has an iodine value of not less than 150 g I2/100 g.

5. The non-aqueous pigment ink according to claim 1, wherein
a mass ratio between an alkyd resin portion and introduced urethane group portions within the urethane-modified alkyd resin is within a range from 60:40 to 99:1.

6. The non-aqueous pigment ink according to claim 2, wherein
a mass ratio between an alkyd resin portion and introduced urethane group portions within the urethane-modified alkyd resin is within a range from 60:40 to 99:1.

7. The non-aqueous pigment ink according to claim 3, wherein
a mass ratio between an alkyd resin portion and introduced urethane group portions within the urethane-modified alkyd resin is within a range from 60:40 to 99:1.

8. The non-aqueous pigment ink according to claim 4, wherein
a mass ratio between an alkyd resin portion and introduced urethane group portions within the urethane-modified alkyd resin is within a range from 60:40 to 99:1.

9. The non-aqueous pigment ink according to claim 1, wherein
preparation of the urethane-modified alkyd resin also comprises a reaction between the polyvalent isocyanate compound and a polyhydric alcohol.

10. The non-aqueous pigment ink according to claim 2, wherein
preparation of the urethane-modified alkyd resin also comprises a reaction between the polyvalent isocyanate compound and a polyhydric alcohol.

11. The non-aqueous pigment ink according to claim 3, wherein
preparation of the urethane-modified alkyd resin also comprises a reaction between the polyvalent isocyanate compound and a polyhydric alcohol.

12. The non-aqueous pigment ink according to claim 4, wherein
preparation of the urethane-modified alkyd resin also comprises a reaction between the polyvalent isocyanate compound and a polyhydric alcohol.

13. The non-aqueous pigment ink according to claim 5, wherein
preparation of the urethane-modified alkyd resin also comprises a reaction between the polyvalent isocyanate compound and a polyhydric alcohol.

14. The non-aqueous pigment ink according to claim 6, wherein
preparation of the urethane-modified alkyd resin also comprises a reaction between the polyvalent isocyanate compound and a polyhydric alcohol.

15. The non-aqueous pigment ink according to claim 7, wherein
preparation of the urethane-modified alkyd resin also comprises a reaction between the polyvalent isocyanate compound and a polyhydric alcohol.

16. The non-aqueous pigment ink according to claim 8, wherein
preparation of the urethane-modified alkyd resin also comprises a reaction between the polyvalent isocyanate compound and a polyhydric alcohol.

17. The non-aqueous pigment ink according to claim 1, wherein
a mass of the resin comprising the non-aqueous resin dispersion particles relative to a value of 1 for a mass of the pigment is not less than 0.3 and not more than 1.0.

18. A printed item printed using the non-aqueous pigment ink according to claim 1.

19. A pigment dispersant for a non-aqueous pigment ink, wherein
the pigment dispersant comprises a urethane-modified alkyd resin, which is formed from an oil-modified alkyd resin and/or fatty acid-modified alkyd resin having an oil length of not less than 50% by mass into which urethane groups have been introduced, and is insoluble in solvents having a 50% distillation point of 150° C. or higher, and
the urethane-modified alkyd resin is prepared by bonding an amino alcohol to double bonds within the oil-modified alkyd resin and/or fatty acid-modified alkyd resin, and then reacting the amino alcohol with a polyvalent isocyanate compound to introduce the urethane groups.

20. The non-aqueous pigment ink according to claim 1, wherein
a viscosity of the ink at 25° C. is within a range from 5 to 30 mPa·s.

* * * * *